United States Patent [19]

Busch

[11] Patent Number: 4,695,712

[45] Date of Patent: Sep. 22, 1987

[54] FLEXIBLE AUTOREGULATING HEATER WITH A LATCHING MECHANISM

[75] Inventor: Paul F. Busch, Los Altos Hills, Calif.

[73] Assignee: Metcal, Inc., Menlo Park, Calif.

[21] Appl. No.: 586,712

[22] Filed: Mar. 6, 1984

Related U.S. Application Data

[63] Continuation-in-part of Ser. No. 507,919, Jun. 27, 1983, abandoned.

[51] Int. Cl.⁴ ............................................. H05B 3/58
[52] U.S. Cl. ................................. 219/535; 219/10.41; 219/10.79; 219/536; 219/553
[58] Field of Search ............... 219/10.41, 10.43, 10.49, 219/10.51, 10.71, 10.75, 10.77, 10.79, 229, 233, 301, 528, 535, 536, 537, 553, 541, 544; 128/1.3, 303.1, 303.12, 303.13, 303.14; 24/16 R; 30/140; 174/40 R, 40 CC, 106 R, 40 TD, 126 CP; 336/73, 77; 373/138; 156/49

[56] References Cited

U.S. PATENT DOCUMENTS

| | | |
|---|---|---|
| 1,975,436 | 10/1934 | Sorrell et al. ...................... 219/10.41 |
| 2,181,274 | 11/1939 | Jackson et al. .................... 219/10.79 |
| 2,739,829 | 3/1956 | Pedlow et al. ..................... 285/115 |
| 3,197,829 | 8/1965 | Caveney et al. ............... 174/40 CC |
| 3,218,384 | 11/1965 | Shaw .................................. 174/40 R |
| 3,446,909 | 5/1969 | Kahn ................................ 219/535 X |
| 3,482,080 | 12/1969 | Kassen ................................ 219/535 |
| 3,987,276 | 10/1976 | Vogelsanger et al. ............... 219/535 |
| 4,079,192 | 3/1978 | Josse ............................ 174/126 CP |
| 4,091,813 | 5/1978 | Shaw et al. ..................... 128/303.14 |
| 4,110,599 | 8/1978 | Offermann .......................... 219/301 |
| 4,185,632 | 1/1980 | Shaw ................................ 128/303.1 |
| 4,207,896 | 6/1980 | Shaw ................................ 128/303.1 |
| 4,256,945 | 3/1981 | Carter et al. .................... 219/10.75 |
| 4,356,624 | 11/1982 | Coverstone et al. ........... 219/535 X |
| 4,364,390 | 12/1982 | Shaw ................................ 128/303.1 |
| 4,366,356 | 12/1982 | Ando ............................... 219/10.51 |
| 4,402,309 | 9/1983 | Harrison ..................... 219/10.79 X |
| 4,436,565 | 3/1984 | Weitzel et al. ........................ 156/49 |

FOREIGN PATENT DOCUMENTS

| | | |
|---|---|---|
| 41-1743 | 2/1966 | Japan . |
| 41-2676 | 2/1966 | Japan . |
| 41-2677 | 4/1966 | Japan . |
| 41-7257 | 4/1966 | Japan . |
| 1076772 | 7/1967 | United Kingdom . |

OTHER PUBLICATIONS

"New Method of Preventing Ice Formation on Exposed Power Conductors", Toms et al., Proc., IEE, vol. 112, No. 11, Nov. 1965, pp. 2,125, etc.

Primary Examiner—C. L. Albritton
Attorney, Agent, or Firm—Hall, Myers & Rose

[57] ABSTRACT

A flexible autoregulating heater with a latching mechanism to form the strap that may be applied about work to be heated, the strap holding the work during the heating and subsequent cooling cycle. The strap may then be removed or permitted to remain in place to provide a resulting binding force about the finished product. A band strapping tool is modified to not only draw the strap tight but apply electric current to activate the heater.

26 Claims, 17 Drawing Figures

FLEXIBLE AUTOREGULATING HEATER WITH A LATCHING MECHANISM

This application is a continuation-in-part of application Ser. No. 507,919 filed June 23, 1983, now abandoned.

BACKGROUND OF THE INVENTION

The present invention relates to autoregulating electric heaters and methods of using same, and more particularly, to a small ferromagnetic autoregulating electric heater that may be temporarily disposed about a part to be heated or soldered. The heater may be integrated as a permanent part of the structure or removed for subsequent repetitive uses after each heating application is completed.

In the U.S. Pat. No. 4,256,945 of Carter and Krumme, there is described an autoregulating electric heater having a laminated structure; one lamina of which has high magnetic permeability and high resistance and another lamina of which is non-magnetic and has a low resistance (such as copper) in electrical contact, and therefore, thermal contact with the first lamina. This structure is adapted to be connected across a constant current, a.c. source such that the layers are in a sense in parallel across the source.

Due to skin effect, the current is initially confined to the high magnetic permeability, high resistance layer so that $P=KR_1$ where P is power, K is $I^2$ which is a constant, and R is the effective resistance of the permeable material at high current concentrations. The dissipation of power heats the layer until it approaches its Curie temperature. The permeability of the lamina decreases towards the level of the second layer, copper for instance, at about its Curie temperature. The current is no longer confined to the high resistivity first lamina by the magnetic properties of the first lamina, and spreads into the copper layer; the resistance to the current drops materially, $P=KR_2$ where $R_2<<R_1$ is greatly reduced and the heating effect is reduced to a level that maintains the device at or near the Curie temperature. The device thus thermally autoregulates over a narrow temperature range about the Curie temperature.

The current source employed in the aforesaid patent is typically a high frequency source, for instance, 8 to 20 MHz to insure that the current is confined to the thin, high resistivity, magnetic layer until the Curie temperature of the magnetic material is attained. Specifically, the maximum regulation is achieved when the thickness of the magnetic layer is of the order of one skin depth at the frequency of operation. Under these circumstances, the maximum change in effective resistance of the structure is achieved at or about the Curie temperature. This fact can be demonstrated by reference to the equation for skin depth in a monolithic, i.e., non-laminar magnetic structure:

$$S.D. = 5030\sqrt{\frac{\rho}{\mu f}} \text{ cm,}$$

where 29 is the resistivity of the material in ohm-cms, $\mu$ is relative magnetic permeability and f is frequency of the current. The field falls off in accordance with $e^{-x}$ where x is thickness/skin depth. Accordingly, in a monolithic structure, by calculation, 63.2% of the current is confined to one skin depth in the high mu material. In the region of the Curie temperature, where $\mu=1$, the current spreads into a region S.D.$=5030$ $$\sqrt{\frac{\rho}{\mu f}} \text{ cm.}$$

If mu was originally equal to 200 (200–1000 being common), the skin depth in the region at the Curie temperature increases by the square root of 200; i.e., the skin depth in the monolithic structure is now 14.14 times greater than with $\mu=200$.

The same type of reasoning concerning the skin effect may be applied to the two layer laminar structure in the aforesaid patent. Below the Curie temperature, the majority of the current flows in the magnetic layer when the thickness of this layer is nominally one skin depth. In the region of the Curie temperature, the majority of the current now flows in the copper and the resistance drops dramatically. If the thickness of this high mu material were greater than two skin depths, the percentage change of current flowing in the high conductivity copper would be less and the resistivity change would not be as dramatic. Similarly, if the thickness of the high mu material were materially less than one skin depth, the percentage of current flowing in the high resistivity material at a temperature less than the Curie temperature would be less so that the change of resistance at the Curie temperature would again not be as dramatic. The region of 1.0 to perhaps 1.8 skin depths of high mu material is preferred.

An exact relationship for the two layer case is quite complex. The basic mathematical formulas for surface impedance from which expressions can be obtained for the ratio of the maximum resistance, $R_{max}$, below the Curie temperature, to the minimum resistance, $R_{min}$, above the Curie temperature, are given in Section 5.19, pp. 298–303 of the standard reference, "Fields and Waves in Communications. Electronics," 3rd Edition, by S. Ramo, J. R. Winnery, and T. VanDuzer, published by John Wiley and Sons, New York, 1965. Although the theory described in the above reference is precise only for the case of flat layers, it is still accurate enough for all practical applications in which the skin depth is substantially less than the radius of curvature.

Difficulty may arise in such devices when the Curie temperature is achieved due to spread of the current and/or magnetic flux into adjacent regions outside of the device, particularly if the device is located close to sensitive electrical components.

In copending patent application of Carter and Krumme, Ser No. 243,777, filed Mar. 16, 1981, a continuation-in-part application of the application from which the aforesaid patent matured, there is described a mechanism for preventing the high frequency field generated in the heated device from radiating into the regions adjacent the device. This effect is accomplished by insuring that the copper or other material of high conductivity is sufficiently thick, several skin depths at the frequency of the source, to prevent such radiation and electrical field activity. This feature is important in many applications of the device such as a soldering iron where electromagnetic fields may induce relatively large currents in sensitive circuit components which may destroy such components.

As indicated above, the magnetic field in a simple, single layer, i.e., monolithic structure, falls off as $e^{-x}$ so that at three skin depths, the field is 4.9% of maximum, at five skin depths, it is 0.67%, and at ten skin depths, the field is 0.005% of maximum. For some uses, thicknesses of three skin depths are satisfactory although at least five are preferred in most cases, ten or more may be required with some highly sensitive devices in the vicinity of large heating currents.

The devices of the patent and aforesaid application are operative for their intended purposes when connected to a suitable supply, but a drawback is the cost of the high frequency power supply. Where only a very low field may be permitted to radiate from the device, the frequency of the source is preferably maintained quite high, for instance, in the megahertz region, to be able to employ copper or other non-magnetic material having reasonable thicknesses.

In accordance with the invention of co-pending application of John F. Krumme, Ser. No. 543,443, filed Oct. 25, 1983, a continuation in part of Ser. No. 430,317, filed Sept. 30, 1982, now abandoned; both said applications being entitled "Autoregulating Electrically Shielded Heater", a relatively low frequency constant current source may be employed as a result of fabricating the normally non-magnetic, low resistivity layer from a high permeability, high Curie temperature material. Thus, the device comprises a high permeability, high resistivity first layer adjacent the current return path and a high permeability, preferably low resistivity second layer remote from the return path; the second layer having a higher Curie temperature than the first-mentioned layer.

As used herein, the term "high magnetic permeability" refers to materials having permeabilities greater than para-magnetic materials, i.e., ferromagnetic materials, although permeabilities of 100 or more are preferred for most applications.

The theory of operation underlying the invention of the aforesaid application filed on Sept. 30, 1982 is that by using a high permeability, high Curie temperature material as the low resistivity layer, the skin depth of the current in this second layer is such as to confine the current to a quite thin layer even at low frequencies thereby essentially insulating the outer surfaces electrically and magnetically but not thermally with a low resistivity layer of manageable thickness. The second layer is preferably formed of a low resistivity material, but this is not essential.

An example of a device employing two high mu laminae utilizes a layer of Alloy 42 having a resistivity of about 70–80 micro-ohms-cm, a permeability about 200, and a Curie temperature of approximately 300° centigrade. A second layer is formed of carbon steel having a resistivity of about 10 micro-ohms-cm, a permeability of 1000, and a Curie temperature of about 760° centigrade. The skin depths, using a 60 Hz supply are 0.1″ for Alloy 42 and 0.025″ for carbon steel. An example of a practical 60 Hz heater based on the above, may employ a coaxial heater consisting of a 0.25 inch diameter cylindrical or tubular copper conductor (the "return" conductor), a thin layer (perhaps 0.002 in thickness) of insulation, followed by the temperature sensitive magnetic alloy having a permeability of 400 and a thickness of 0.1 inch, and finally an outer jacket of steel having a permeability of 1000 and a thickness of 0.1 inch. The overall heater diameter would be 0.65 inch. If the heater is used in a situation requiring 5 watts per foot of heater length for instance, for protection of a liquid against freezing, the total length of the heater is 1000 feet, the resistance of the heater will be 1.96 ohms. The current will be 50 amperes, and the voltage at the generator end will be 140 volts at temperatures somewhat below the Curie temperature of the temperature sensitive magnetic alloy on the inside of the outer pipe. If there were substantial changes in the electrical resistance due to variations of the thermal load, the required voltage must vary in order to maintain constant current. Such a supply provides current at costs considerably less than a constant current supply at 8 to 20 MHz.

The power regulation ratios (AR) in such a device; 2:1 to 4:1, are not as high as with the device of the patent with a resistivity difference of about 10:1, but the AR difference may be reduced by using materials of higher and lower resistivities for the low Curie temperature and high Curie temperature materials, respectively. Also, a high mu, relatively low resistivity material such as iron or low carbon steel may be employed to further increase the power regulation ratio.

In accordance with the invention of copending patent application Ser. No. 445,862 of John F. Krumme filed on Dec. 1, 1982, autoregulation power ratios of 6:1 to 7:1 are attained while retaining the ability to utilize low frequency supplies without producing unacceptable levels of field radiation.

The objects of the invention are achieved by providing a region of high conductivity at the interface of the two members having high permeability as set forth in the Krumme application, Ser. No. 543,443, filed Oct. 25, 1983.

The material in the interface region may be copper, for instance, or other highly conductive material. The material may appear as a separate layer, a sandwich of magnetic, nonmagnetic and magnetic material or may be bonded to the high and/or low Curie temperature, ferromagnetic layers at the interface to provide a low resistivity, interface region.

Typical thicknesses of the sandwich construction for 1 KHz are 0.03″ for both the low and high Curie temperature ferromagnetic materials, respectively, and 0.010 inch for the copper layer.

In operation, as the Curie temperature of the first layer is approached and its permeability rapidly decreases, the current spreads into the copper layer and into the second magnetic layer. The total resistance of the structure, due to the presence of the copper, drops dramatically providing a high autoregulating ratio. Also, most of the current is confined to the copper layer and only a small percentage penetrates into the second magnetic layer. In consequence, this latter layer need be only 3 to 5 skin depths thick to effect virtually complete shielding of the device. Thus, the object of a large autoregulating power ratio in a relatively small device using a low frequency source is achieved. By a low frequency is meant a source in the range of 50 Hz to 10,000 Hz although 50 to 8000 Hz is fully adequate.

With autoregulating ratios of 6:1 and 7:1, the heating variations below and above Curie temperature are quite large so that the apparatus may respond rapidly to thermal load variations and thus maintain accurate temperature regulation in a small device operating at low frequency.

In all of the above cases, the autoregulating heater structures are rigid and either constitute all or part of the device to be heated, i.e., the work piece, and becomes of necessity, a part of the final structure. The rigidity of the prior devices and the fact that the devices are, of necessity, part of the work, prevents their use in certain specialized areas.

BRIEF DESCRIPTION OF THE PRESENT INVENTION

In accordance with the present invention, there is disclosed an autoregulating heater and methods of utilizing same, employing the heating techniques of any one of the cited applications or the cited patents, which heater is flexible and does not, of necessity, become a part of the finished structure.

More specifically, there are numerous cases in which it is desired to employ a flexible self regulating heater that can both heat, without overheating, and at the same time, tightly hold the work. A classic example of such use is in the shielded communications cable art. In many applications of such cables, it is necessary to solder a ground wire to the braided shield of the cable. About 15% of the cables are damaged in the process due to overheating of the insulation between the braided shield and the interior conductor or conductors. A heater, in accordance with the present invention, is employed in such a situation to strap the ground wire and solder to the shield and then heat the solder and shield to a specific, well regulated temperature above the melting point of the solder employed and below the melting or destruction temperature of the insulation. In this situation, the heater strap rigidly holds the solder, shield and strap together during the entire operation preventing a cold solder joint and insuring that the cable insulation is not overheated.

Other instances wherein a flexible, attachable heater is invaluable, is in the fusion and melting of plastics. Other situations where holding and controlled heating is important and/or useful are joining cable braids together where cables are joined, spot heating, such as in attaching plumbing couplings and the like; and thawing frozen pipes, where the strap is secured around the pipe, heated and then removed.

The heater of the present invention contemplates, in one of the preferred embodiments, a flexible strap, which comprises a plurality of thin flexible layers having, in the following order, an outer layer of insulation, a first layer of copper, a second layer of insulation, a layer of ferromagnetic material, and a second layer of copper in contact with the ferromagentic layer. The firstmentioned copper layer is joined to the other copper layer at one end of the strap and the copper layers at the other end of the strap are adapted to be connected to a suitable constant current a.c. source.

The end of the strap remote from the source connection is provided with a closure member which, in one form, may be a plastic ball captured in a tapered hood whereby the other end of the strap may be readily inserted but cannot be readily withdrawn. Thus, the structure may be strapped about any member to be heated.

A layer of solder or other such material may be bonded to the copper inner layer of the strap or may be provided to the copper inner layer of the strap or may be provided as a separate ribbon and wrapped about the work. In either event, the solder ribbon or the strip with integral solder is placed in an appropriate location about the work and the strap applied over it with the second layer of copper adjacent the strap.

An inductive version of the strap heater may also be employed. In such an embodiment, a high mu laminate is covered on its outer surface by a layer of insulation. The laminate is provided with a latch modified to provide a short circuited turn and may also have its inner surface covered with solder.

A tool may be provided which permits a flexible conductive strap to be drawn tightly about the heater strap. A relatively high frequency constant current is applied to the conductive strap and large currents are induced in the high mu material. Upon approaching the Curie temperature, the mu of the ferromagnetic material approaches one and the currents in the heater strap migrate into the interior of the heater strap reducing the resistance of the strap. It should be noted that if the layer of insulation material is quite thin, a virtually unity coupling is achieved between the two straps and the current in the heater strap remains virtually constant with variations of mu of the ferromagnetic heater strap. If the insulation layer is relatively thick, unity coupling is not achieved and as the mu is decreased, the induced current does not remain constant but will decrease somewhat enhancing the autoregulation ratio.

Any of the devices described above may take two forms. In one form, the heater is considered a disposable item and after use, is simply left in place. In this embodiment, the outer surface of the second copper layer has a layer of solder formed on it so that the strap becomes soldered to the end product. In another embodiment of the invention, the inner surface of the copper is covered with a very thin layer of high temperature plastic so that it is not contacted by the solder and may be readily removed.

In either of the above cases, the straps, during the actual soldering process, function the same. Referring back to the braided cable example, a ground strap or wire inserted between adjacent-strands of the braid and a foil of solder is applied under the braid at the insertion point. The strap is now applied and drawn tight with a Panduit tool, for instance. Current is applied to the strap and as the solder melts, the strap may, if desirable, be further tightened by the Panduit tool to insure that the braid, ground strap and solder are all rigidly held during the coupling phase of the operation. After cooling, the strap may be left in place or removed, depending on the type of strap employed.

Regardless of the form of the strap employed, a Panduit tool, which is manufactured by Panduit Corporation of Finley Park, Ill., (see U.S. Pat. Nos. Re. 26,492; 3,254,680 and 3,661,187) may be modified by use of insulation at appropriate locations to insure that the current is applied to appropriate locations of the strap. Thus, as the tool is applied to the strap and operated to draw the strap tight, it causes electrodes to engage the strap at appropriate locations to apply current thereto as and when desired.

The advantage of the system described above is that regardless of changes in dimensions of the work during the heating cycle due to melting of the solder, displacement of members, etc., the strap may be retained taut preventing movement of the members which might otherwise result in a cold solder joint or no real joint at all. Also, and of great importance, is the fact that the strap is an autoregulating heater so that no damage results to the cable insulation.

There is still a further advantage to the device and that relates to the impedance match between the power source and the strap. In prior devices, the length of the load circuit was quite short, an inch or two at the most. In the present device, the circuit is relatively quite long, three or more inches at least so that even though a large drop in resistance is experienced in the region of the Curie temperature, a reasonable impedance is maintained. As an example, if a one inch cable is to have a ground strap attached, the total length of the heater in the circuit in one embodiment is $2\pi D$ and in embodiments utilizing parallel end connected strips or legs, is equal to the diameter of the member to be heated times the number of parallel legs times $\pi$, or $X\pi D$ where X is the number of parallel legs or strips. A pipe coupling and heater combined in accordance with the prior devices would have a length of perhaps two inches, i.e., the axial length of the coupling. Thus, in the device of the present invention, the resistance value undergoes a considerable change as in the prior devices but does not fall to as low values and thus impedance matching is not as severe a problem.

The heater strap of the present invention has an additional function in that if it is permitted to become part of the final structure, it materially adds to the strength of such structure. For instance, if two cables are joined end to end and the shields overlapped, the strap maintains a strong inwardly directed force on the braid overlapped area and reinforces the structure. Similarly, if a braid is attached to the outer shell of a connector, the strap maintains a strong inward force on the braid to secure it to the connector; such force being independent of the strength of the solder connection.

The strap is not necessarily employed only with solder; the use with solder being a familiar example of one field of application. The strap may be employed to heat adhesives, mastics, fluxes, plastics and other heat softenable or settable materials for bonding, shaping, forming, etc.

The method contemplated by the invention is that of binding a work piece to be heated or binding together work pieces to be concurrently heated by a strap constituting an autoregulating heater, energizing the heater and maintaining approximately constant tension in the strap during the heating, and if desired, the subsequent cooling process.

DESCRIPTION OF THE PREFERRED EMBODIMENTS

A further embodiment of the present invention contemplates a structure for increasing the flexibility of the strap, concurrently increasing its minimum resistance whereby to simplify impedance matching of the current source to the heater and also confining the heat to a specified region; the region of the work in contact with the heater.

Referring initially to flexibility, the strap defined by a center copper core surrounded by insulation and then in succession high mu material, and then copper, is somewhat stiff. It has been found that if the high mu material is confined to a flat strip arranged opposite only one surface of the center (current return) conductor and the surface of the outer copper conductor disposed on the opposite side of the center conductor from the high mu material is provided with a plurality of closely spaced slots perpendicular to the length of the strap, the flexibility of the strap is greatly increased.

Further, the slots confine the current to a lesser area (by at least 50%) than the unslotted heater and also increase the resistance of the strap to provide greater ease of matching the constant current source to the strap. Also, by confining the current to only that region of the outer conductor contacting the high mu material, heat generation is confined to that region.

Again, the form of the heater can be varied in accordance with the various prior applications and patents.

BRIEF DESCRIPTION OF THE DRAAWINGS

The above and still further objects, features and advantages of the present invention will become apparent upon consideration of the following detailed description of specific embodiments thereof, especially when taken in conjunction with the accompanying drawings, wherein:

FIGS. 9 and 10 illlustrate one part of an alternative latching arrangement.

Figures 1, 2, 4, 5, 6:
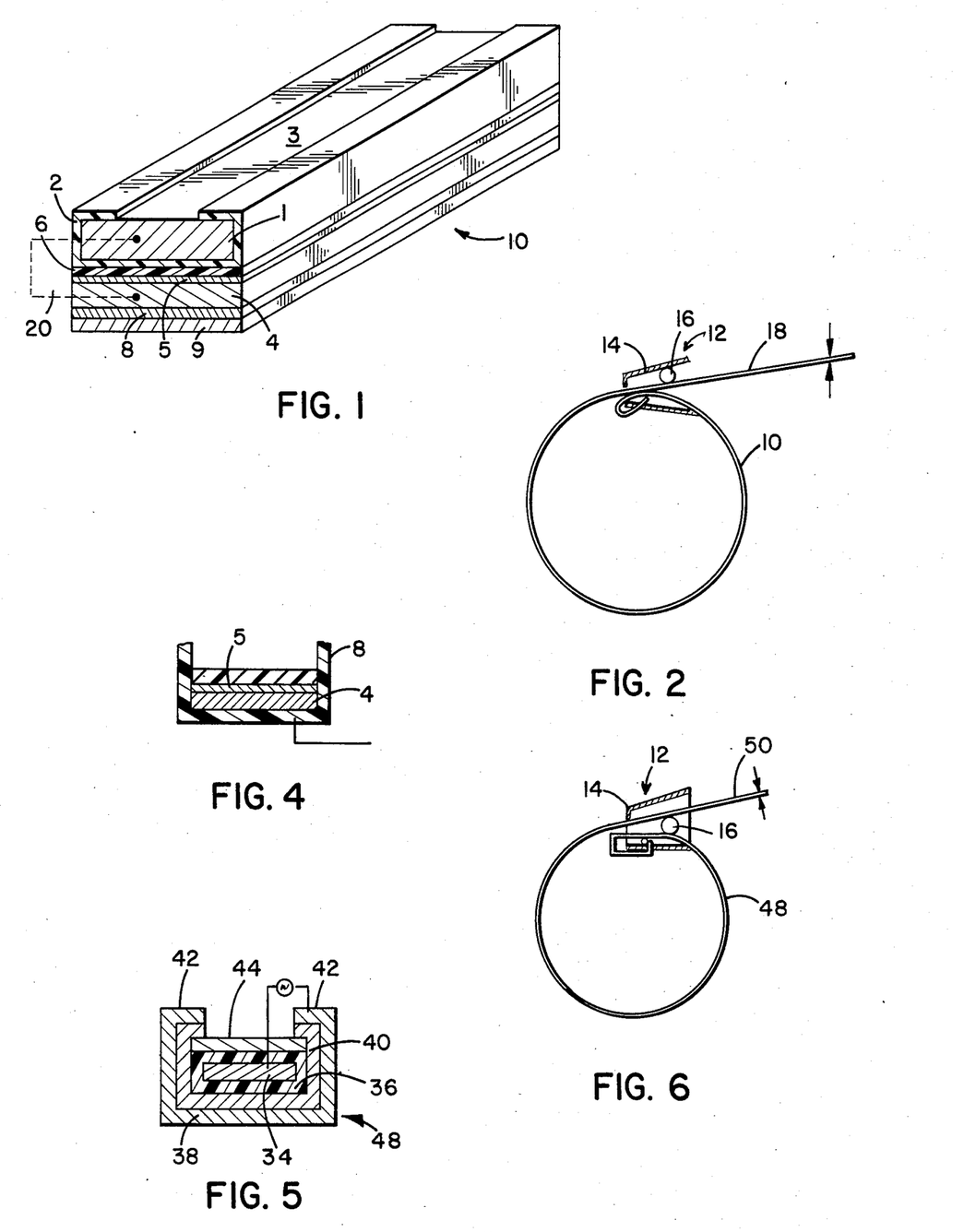
FIG. 1 is a view partially in cross section and partially in projection of one embodiment of a heater strap of the present invention.
FIG. 2 a diagrammatic view of the strap of FIG. 1 and a latching mechanism suitable for use therewith.
FIG. 4 illustrates a modification of the strap of FIG. 1.
FIG. 5 illustrates a symmetrical embodiment of the strap of FIG. 1.
FIG. 6 illustrates a modification of the latch of FIG. 2.

Referring now specifically to FIG. 1 of the accompanying drawings, there is illustrated, greatly enlarged, one form of heater strap 10 of the present invention. The strap includes a high conductivity current return bus 1 enveloped on about three and a half sides with a thin layer of high temperature insulation such as a layer of 0.001 inch Kapton tape 2. An upper exposed surface 3 of the bus 1 is provided in this embodiment.

A composite of a layer 4 of low resistivity material, such as copper, and a layer 5 of high mu material such as alloy 42, is bonded by a layer 6 of adhesive to a surface of the Kapton tape 2 remote from the surface 3 of the bus 1. The composite of layers 4 and 5 constitutes one of the forms of heater structure described above.

The lower surface, as illustrated in FIG. 1 of the layer 4, has a layer 8 of some form of material applied thereto. If it is desired to be able to remove the strap after the heating operation, then the layer 8 should be a thin layer of high temperature insulating material such as Kapton. Such a layer will increase the time required to heat the work to the desired temperature. If it is desired to have the strap become a permanent part of the structure so as to lend strength thereto, the layer 8 may be solder, mastic, adhesive, etc. The layer 8 is terminated short of the end of the tape if it is a layer of low conductivity material so that an electrical connection can be made to the layer 4 of the heater. Connection to the layer 1 is made at the surface 3. The layers 1, 4 and 5 are all connected together at their ends remote from the end to which current is applied. Such is accomplished by omitting the layers 2 and 6 and soldering or spot welding the materials together or bonding them with a conductive mastic or adhesive.

Figure 7:
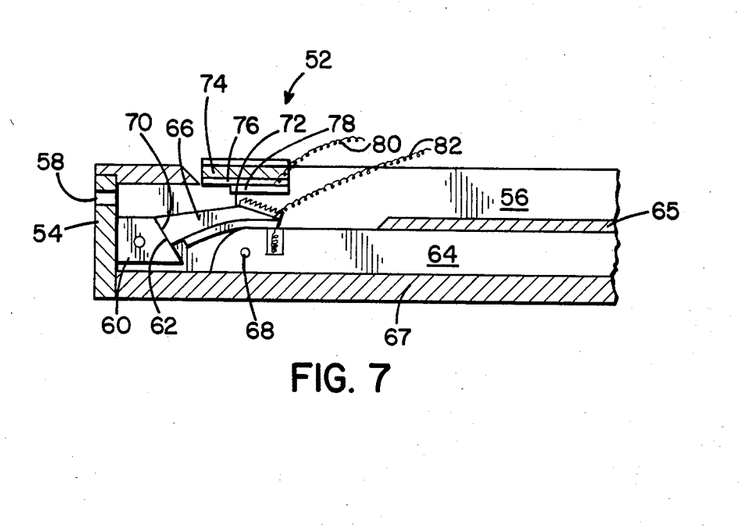
FIG. 7 illustrates a strapping tool modified for use in the system of the present invention.

The layer 8 may be covered by a tough, thin metal covering such as indicated by layer 9 to protect the electrical circuit elements from the dog 72 of FIG. 7.

Referring now specifically to FIG. 2 of the accompanying drawings, the strap 10 is fitted with a locking device 12. The device 12 is secured adjacent one end of the strap and comprises a tapered housing 14 and a ball 16.

In operation, the end 18 of the strap remote from the device 12 is inserted through the device 12 under the ball 16. The ball 16, upon movement of the strap from left to right in FIG. 2 moves to the right and permits free passage of the strap. Upon attempted movement of the strap 10 from right to left, however, the ball 16 is moved from right to left and is forced downward and presses the strap between the ball and the bottom wall of the housing 12. The wedging action prevents further movement of the strap toward the left.

The ball 16 is made of a nonconductive material in order to prevent a short circuit across the strap at its input end. Specifically, is housing characteristically made of metal and is in contact with the layer 8 or 4 of the strap as illustrated in FIG. 1. If the ball 16 were of metal, it would produce short circuit at the device 12 so that no current would be supplied to the heating portion of the strap 10.

It should be noted that the high mu layer 5 may be terminated adjacent the device 12 so that little heating occurs in the region between the device 12 and the location where current is applied.

The device of FIG. 1 is illustrated as a heater of the type set forth in U.S. Pat. No. 4,256,945. As previously indicated, it may take the form of any one of the other heaters discussed above.

Further, the insulating member 2 may completely cover the top of the layer 1 as indicated by the dashed lines 20.

In this event, the layer provided with a window for contact by the current supply connector or is terminated short of the end of the tape to which current is supplied.

Figure 3:
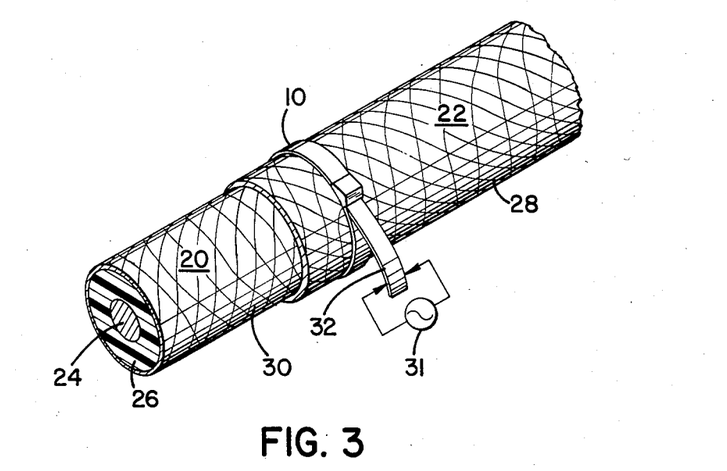
FIG. 3 illustrates the soldering together of the overlapping shields of two cables utilizing the device of FIG. 2.

If the layer 8 is solder or other heat activated bonding material, the strap becomes a permanent part of the final structure. Such is illustrated in FIG. 3 of the drawings. A first length of shielded cable 20 is to be connected to a second length of shielded cable 22. After splicing the center conductors 24 and filling the gap between the insulation layers 26, shield 28 of cable 22 is pulled over shield 30 of table 20. A strap 10, such as illustrated in FIG. 1 of the accompanying drawings, is positioned about the region of the cables where the braids 30 and 28 overlap. A tail end 32 of strap 10 is connected across a source 31 of constant a.c. energy until the solder layer 8 melts. The current is terminated, the solder cools, bonding the strap to braid 28 and braid 28 to braid 30.

The end 32 of the strap 10 may then be cut off and the operation is complete.

There are several features of the device that should be emphasized. Physically, the strap is dimensionless; that is, the strap may be sold to the public in long coiled lengths, 50 feet, 100 feet, etc. the user buys some number of latches and a latch application tool so that as each length is used and cut off, a latch can be attached for the next length. The latch may be supplied with an area of individual teeth to pierce the strap and short the copper layers to one another. Other layer shorting means may be employed such as clips, staples, etc.

It is also important that the strap be designed properly to achieve efficient coupling of power to the strap from the source of power. Appropriate impedance matching circuitry between the strap and the source of power are usually required; the precise design of this circuitry, depending on the cross sectional dimensions of the strap, the length of the strap, the frequency, and the resistivity and permeability of the magnetic materials employed, as well as the resistivity of the non-magnetic materials.

Another feature of the invention is that the strap of FIG. 1 is also reusable. The strap may be stripped off the work while the solder is still hot. The above approach is particularly possible where the solder penetrates the work, as with braid, since removal of the strap does not affect the solder that penetrated. The same is true where the strap is employed to fuse maaterials such as plastic or heat sealable tapes used in cable repair and the like.

Another important feature of the strap is inherent in its basic design. The strap may be applied from the side of a cable, pipe, or the like it does not have to be slipped over the end of the cable or pipe before joining them.

An alternative form of structure is illustrated in FIG. 4 of the accompanying drawings. In this configuration, the layer 8 is insulation, and it is extended up the sides of the layers 4, 5 and 6 so as to prevent solder from contacting layers 4 and/or 5. In this configuration, the solder is applied to the work, such as overlapping braids 28 and 30, as a ribbon before the strap 10 is applied. In this configuration, the strap 10 may be removed from the work by forcing the ball 16 toward the right as viewed in FIG. 2. A hole in the top of the device 12 may be provided to permit a sharp tool to be inserted so as to retract the ball during the removal operation.

Still another strap configuration is illustrated in FIG. 5 of the accompanying drawings. In this embodiment of a strap, designated by reference numeral 48, the current return bus is located in the center of the structure. Specifically, current return bus 34 is surrounded by an insulating layer 36. A copper layer 38 is lined with a ferromagnetic material 40 of the desired Curie temperature and surrounds three sides of the layer 36 and small segments 42 thereof extend over the tape on opposite sides of the top of the structure. A further copper layer 44 overlies the top layer 36 is disposed under the segments 42 of the layers 38 and 40.

In this configuration, the entire exterior of the structure is at the same potential and the ball 16 may be metal since the short circuit problem is eliminated. As in the structure of FIG. 1, the ends of the layers 34 and 38 remote from the source are connected together and are provided with a coupling device, such as the device 12 of FIG. 2. In the present cohfiguration, the end of the strap remote from the point of attachment of device 12, passes over top of the ball (see FIG. 6) and permits readier access of the tool to end section 50 of the strap 48. The layers 36 and 44 may have large windows therein adjacent the end of section 50 of the strap 48 so that an electrode of the source can contact layer 34.

Referring now specifically to FIG. 7 of the accompanying drawings, there is illustrated a partial view of a Panduit installation tool 52 modified to operate in the system of the present invention. The tool comprises an immovable front plate 54 extending forward from a back wall 56 of the tool 52. The plate 54 is slotted at 58 to receive the strap therein. A member 60 having an inclined surface 62 formed at its right end as viewed in FIG. 7 is secured to the right side of the plate 54.

A slide.64 which, in operation of the tool, is caused to move to the right from the rest position illustrated in FIG. 7, is guided between guide walls 65 and 67 extending forward from the back wall 56 of the tool. The slide is operated by a trigger, not illustrated.

The slide 64, adjacent its left or forward end, carries a dog 66 which fits in a slot in slide 64 and is pivoted about pivot pin 68. Left surface 70 of dog 68 is inclined and mates with surface 62 of the member 60. The right end of dog 66 has an upward extension 72 with serrations on its upper surface. The dog is spring biased to rotate counterclockwise so that when the slide 64 pulls the dog 66 to the right, its surface 70 is disengaged from surface 62 of the member 60 and the dog rotates counterclockwise with the serration of its end 72 rotating towards a plate 74 that extends over the top of the end 72 of the dog and moves with it; being secured also to the slide 64.

Figure 8:
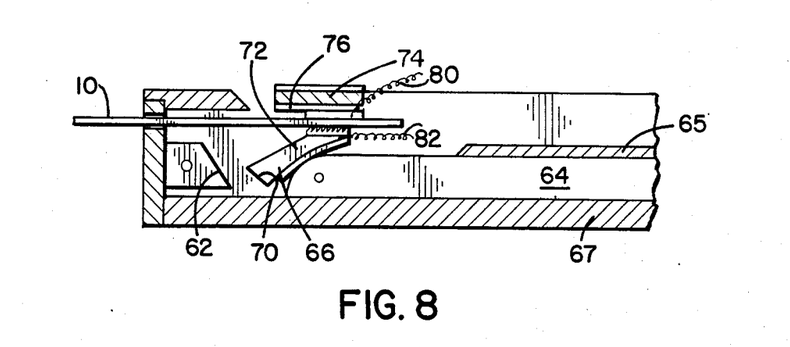
FIG. 8 illlustrates the tool of FIG. 7 when applying strapping force to a heater strap.

Referring to the upper portion of FIG. 8, the tool is illustrated in its operating position with a strap trapped between the dog 66 and the plate 74. In the lower portion of FIG. 8, it is apparent that movement of the slide to the right pulls the strap with it, and the latch 12 of FIG. 1 or FIG. 6 prevents slippage of the strap upon release of the strap when the slide moves to the left. The surface 62 of member 60 cams the dog clockwise to the position illustrated in FIG. 7 so that the tool may be readily moved to the left along the strap to put it into position for a further tightening sequence.

The tool as thus far described is available on the market today. In order to adapt the tool for use in the present invention, the member 74 is provided on its surface opposite the dog end 72 with a relatively heavy layer 76 of insulation. An electrical contact 78 may be disposed on the insulating layer 76 and, if provided, is electrically connected via lead 80 to one terminal of a constant current source such as source 31 of FIG. 3. Tho part of the dog 72 carrying the serrated face is insulated from the slide 64 and may be connected via a lead 82 to a second terminal of a constant current source.

In the use of the system, the strap 10 is applied about the member or members to be clamped and heated; the tail 18 of the strap being inserted in the tool through the slot 58 and between plate 74 and dog end 72. The tool is operated so as to draw the strap tight and the current source is activated. If due to melting or flowing of the activated sealant or flow of plastic, etc., the strap loosens, the tool is again operated to keep the strap tight. Obviously, enough pressure is maintained on the operating mechanism of the tool to cause the dog end 72 to engage the strap and press it against the electrode 78.

The tool need not apply the current to the strap at all or at the clamping location. An independent source may be provided or the tool may provide an electrical connection elsewhere than the jaws.

Figure 9:
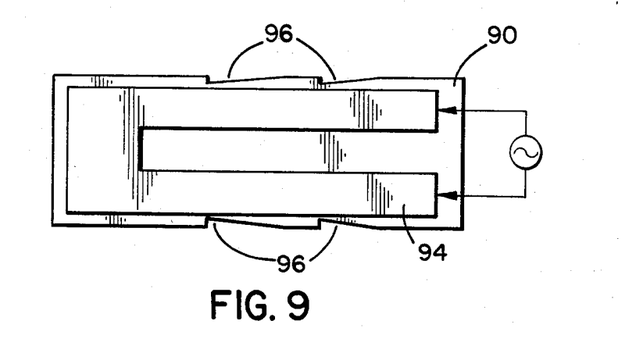
FIG. 9 is a top view illustrating and FIG. 10 is a front view in section showing end-to-end connected straps disposed in parallel, eliminating the need for a ground return path.
Figure 10:
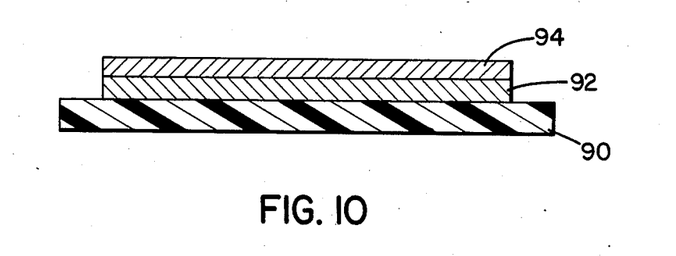

In another form of strap, as illustrated in FIGS. 9 and 10 of the accompanying drawings, the strap is electrically U-shaped. An insulating base 90 has disposed on its upper surface, as viewed in FIG. 10, a high mu layer 92 which is disposed over the insulating layer 90 and a copper or the like layer 94 covers the high mu layer.

In those cases where the strap is long enough to require a balanced excitation at the points of contact, i.e., the voltages at the points of contact must be equal and opposite with respect to ground, a "balun" or balance-to-unbalance transformer is required to connect the heater to an unbalanced, shielded cable such as a coaxial cable. However, if the strap is very short compared with a wavelength, either point of contact can be grounded, i.e., connected to the shield of the cable without the use of a balun.

The structure may obviously take other forms such as two U's joined at the end of two adjacent legs to provide a four legged device. Such a device further increases the electrical length of the device to twice that of FIG. 1 or FIG. 9. Thus, for a one inch cable, the electrical length of a strap with a double U configuration is $4\pi$ or about 12.6 inches.

Figure 11:
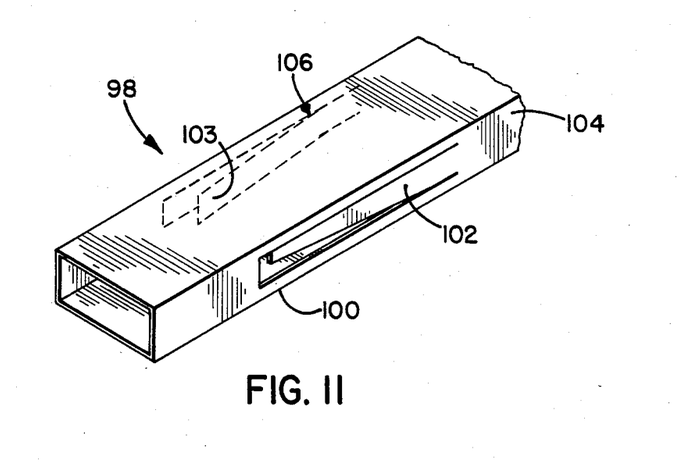
FIG. 11 illustrates a sleeve for latching the serrated strap of FIG. 10.

FIG. 9 illustrates one of several alternative forms of latching. The outer edge is provided with cuts 96 having both tapered and right angled walls. In FIG. 11, there is illustrated a latch 98 for such a strap. The latch is a hollow rectangular sleeve 100 having one or more pairs of resilient, inwardly directed tongues 102 and 103 disposed opposite one another in the narrow vertical walls 104 and 106, respectively, of the sleeve 100. The heater of FIG. 9 may be readily inserted into sleeve 100 from right to left, but upon attempted movement from left to right, the tongues 102 and 103 engage the vertical walls as viewed in FIG. 9 of the edge cuts 96 in the member 90 and prevent withdrawal of the strap unless the tongues are moved outwardly by one means or another.

Figure 12:
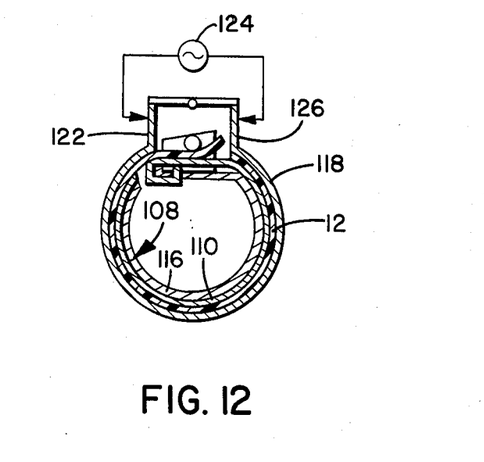
FIG. 12 is a schematic diagram, both electrical and mechanical of an inductive heater strap.
Figure 13:
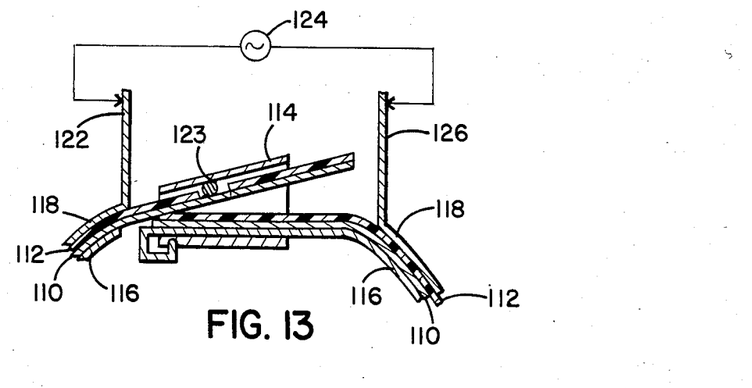
FIG. 13 is a detailed partial crosssectional view of a segment of the strap of FIG. 12.

The above structures require a direct connection of the strap heater across the power supply. Referring specifically to FIGS. 12 and 13 there is illustrated one version of an inductive strap heater 108 in accordance with one embodiment of the present invention. The heater comprises a band 110 pf relatively high mu material covered on its outer surface by a thin layer 112 of insulation. A latch 114 is as illustrated in and described with respect to FIG. 2 except that latching ball 123 is conductive to provide a short circuited turn to permit circulating currents to be established. If desired, a layer 116 of solder may extend over the entire inner surface of layer 110 between the ends of the latch 114.

The strap is clamped as previously described about a cable or the like and is then heated by a discontinuous flexible strap 118 of conductive material connected via posts 120 and 126 to a source 124 of constant alternating current of appropriate frequency. The posts 120 and 122 are carried on the ends of a pair of pliers or jaws 120 illustrated in FIG. 14 of the accompanying drawings.

Figure 14:
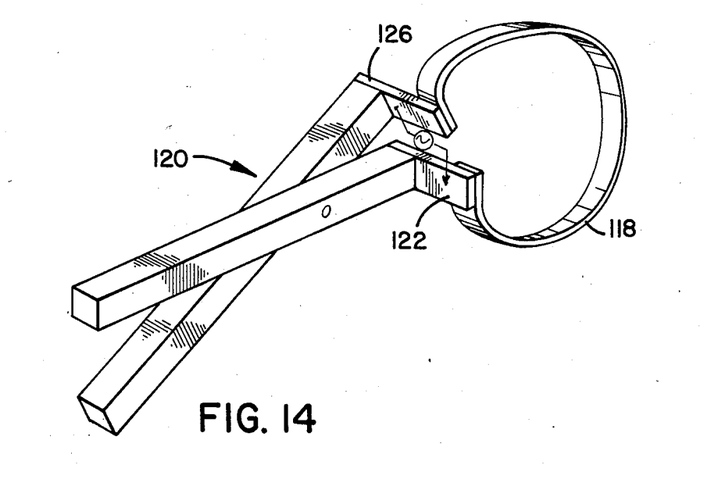
FIG. 14. is a perspective view of a tool for use with the inductive heater strap.

In use, the strap heater 108 is cinched to the cable with the solder contacting, for instance, the braid of a cable. The tool of FIG. 14 is then applied by opening its jaws to open the strap 118. The strap is applied about the strap 108, the jaws closed until strap 118 is clamped about the strap 108 and then current is applied. By induction, the strap 108 is heated to its Curie temperature at which time, the mu of the material of the layer 110 is reduced and the current spreads into the interior of the layer resulting in reduced resistance. Parameters such as current, surface area, resistance, etc. are chosen such that above Curie temperature the heat dissipated into the surrounding atmosphere reduces the temperature of the strap below the Curie temperature and autoregulation occurs.

The various arrangements of the prior applications may also be employed. For instance, and reference is made to FIG. 15 of the accompanying drawings, a copper layer 130 may be laminated with a ferromagnetc layer 128. Again, an insulating layer 132 is provided and a solder layer 134 may be provided.

Figure 15:
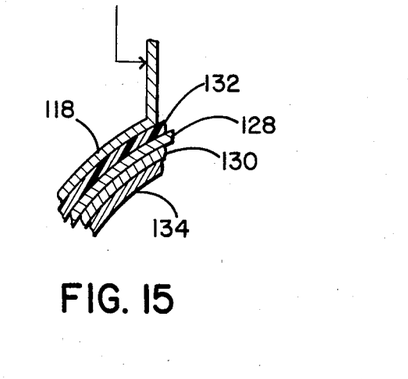
FIG. 15 is a detail in cross section of another embodiment of an inductive heater strap.

In operation, when Curie temperature is approached, the current spreads from high resistance layer 128 into low resistance layer 130. Autoregulation results.

The straps described are remarkably thin and, for instance, a strap of FIG. 1 employed to solder the braid of a 1½ inch to 2 inch copper pipe are about 0.018 inch thick and about 0.180 inch wide. The copper and/or alloy 42 or the materials selected are sufficiently strong to permit effective banding of the structure. Such a strap operated at 250 watts soldered a copper coupling onto a 1½ inch copper pipe in one minute. Upon raising the energy to 500 watts, the time dropped to 20 secs. It was noted that at about 300 watts, the times dropped materially, the load becoming a short heat sink rather than an infinite heat sink at about that energy level in the structure defined above.

It is apparent that the present invention provides a unique combined heater and strapping device for performing many functions requiring the work to be tightly held and heated to a precise temperature. FIG. 3 illustrates a specific use of the device; the connecting of overlapping braids or braids overlapping connectors, but there is no real difference in operation if the overlapping members are plastic tubes to be joined, copper pipes and/or fittings to be joined, the soldering of a ground strap to a cable, the, heating of a glue, mastic, or adhesive, flux or the like. The strap may become part of the final structure or be removed. If incorporated in the final structure, it becomes a reinforcing member and adds strength to the completed product.

The strap may also be employed as a heater. Due to the ability of side entry, it may be applied over a frozen section of a pipe or formed as a helix around a pipe to heat the contents of the pipe for anyone of a variety of uses such as thawing, promoting a chemical reaction, and the like.

The latch structure may take many forms although those of FIG. 2 particularly recommend themselves to permanent installations since they are remarkably small, a ¼ inch wide, ⅜ inch long and about ¼ inch in height. Such a latch works very well with the tool of FIGS. 9 and 10 and provides a strong hold on the strap long after completion of application.

Figure 16:
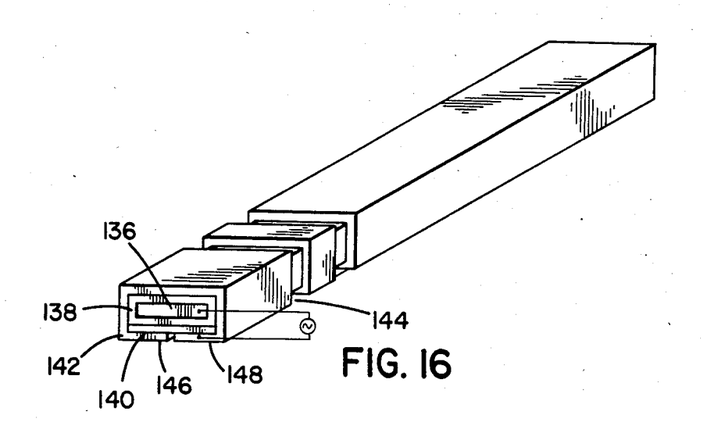
FIG. 16 is a view in perspective of the preferred embodiment of the present invention.
Figure 17:
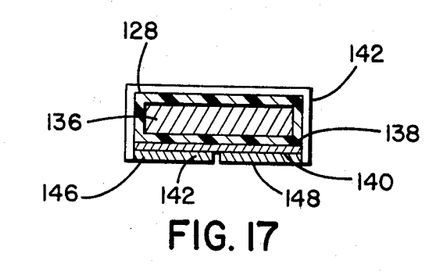
FIG. 17 is a cross-sectional view taken along Section line 17—17 of FIG. 16.

Referring specifically to FIGS. 16 and 17, there is illustrated a preferred embodiment of the present invention. A current return conductor 136 is surrounded by a layer of insulation 138. A high mu material 140 is disposed along the lower surface only as viewed in the FIGS. of the insulating layer 138. The structure is surrounded by a copper layer 142 forming the outer layer of the device.

The copper layer 142 or layer of other highly or moderately conductive material, is slotted as indicated by reference numeral 144. The slots 144, depending upon the impedance of the source and the desired flexibility, may extend only across the top of or across the top and down the sides of the strap, the latter condition being illustrated in FIGS. 16 and 17.

The slots 144 restrict the current flow to the unslottedd regions which in the embodiment as illustrated are the regions 146 and 148 lying adjacent only the high mu layer 140. The restriction of the curre0t to the thin copper layer 146-148 increases materially the resistance of the overall device rendering impedance matching of the current source to the heater far simpler. The flexibility imparted to the heater on the other hand, by the slots 144, materially facilitates the ease with which the strap may be wrapped about a workpiece and drawn tightly about all regions thereof and to conform to irregular contours more readily than stiffer non-slotted straps.

The high mu layer 140 may be a stand alone layer as illustrated or may be laminated to a copper base or base of other material.

An interesting feature of this design is that current is confined by the slots 144 to the regions 146 and 148 of the outer conductive layer. In consequence, heat is generated only in that region including particularly the high mu material 140. Thus, the heat is generated immediately adjacent the workpiece; the heat generator, the high mu material, being separated from the workpiece only by a thin layer of conductive material, copper, stainless steel, etc., depending upon the desired electrical and physical characteristics of the heater.

The heater is thus rendered highly flexible, very efficient and more easily matched to the power supply, particularly at operating frequencies of 8-20 MHz, than the other forms of the device due to the high resistance of the strap of FIGS. 16 and 17.

The frequency of the supply utilized herein is not restricted to a specific range of frequencies. Operation above the range of 1000 to 5000 Hz increases performance very little unless frequencies sufficiently high to significantly increase the resistance of the first layer are employed.

The term "constant current" as employed herein does not mean a current that cannot increase but means a current that obeys the following formula:

$$\frac{\Delta I}{I} > -\tfrac{1}{2}\frac{\Delta R}{R}.$$

Specifically, in order to autoregulate, the power delivered to the load when the heater exceeds Curie temperature, must be less than the power delivered to the load below Curie temperature. If the current is held invariable, then the best autoregulating ratio is achieved short of controlling the power supply to reduce current. So long, however, as the current is reduced sufficiently to reduce heating, autoregulation is achieved. Thus, when large autoregulating ratios are not required, constraints on the degree of current control may be relaxed reducing the cost of the power supply.

The above equation is derived by analyzing the equation:

$P=(I+\Delta I)2(R+\Delta R$ where P is power, differentiating P with respect to R)

$$\frac{dP}{dR} = I^2 + 2RI\left(\frac{dI}{dR}\right)$$

and to satisfy the requirements for autoregulation

Thus,
$$\frac{dP}{dR} > 0.$$

$$I^2 + 2RI\left(\frac{dI}{dR}\right) > 0$$

which reduces to the above equation.

As previously indicated, insulation may be applied to the inner surface (the work contacting surface of the strap) to prevent adherence of the strap to the solder. Such effect may also be achieved by employing an outer conductor to which solder does not readily adhere; such as aluminum, titanium or the like. The insulators, previously mentioned, may be any relatively flexible, heat resistant, organic or inorganic material also not wetted by solder. The specific materials are determined by the heat to be encountered and the type of solder employed. The metallic examples given above are for tin-lead solders. Aluminum and titanium may also be employed with brazing and other high temperature solders.

Once given the above disclosure, many other features, modifications and improvements will become apparent to the skilled artisan. Such other modifications, features and improvements are, therefore, considered a part of this invention, the scope of which is to be determined by the following claims.

I claim:

1. An autoregulating heater comprising
    a flexible, relatively flat, elongated, autoregulating heater strap having at least a first thin elongated member of ferromagnetic material,
    means for securing said heater strap in a band about a workpiece to be heated, and
    means for developing an alternating current in said strap sufficient to cause its temperature to approach the Curie temperature of said ferromagnetic material.
2. The heater according to claim 1 wherein said strap further comprises
    a plurality of parallel, elongated members connected together at one common end to increase the electrical length thereof across which the current is applied.
3. The heater according to claim 1 or claim 2 wherein said elongated member has a thin covering over one of its elongated, flat surfaces of a conductive material.
4. The heater according to claim 3 wherein said thin covering has a plurality of generally parallel, elongated slots each extending transverse to the elongated dimension of said strap and arrayed along at least one of its surfaces.
5. The heater according to claim 1 wherein said means for developing comprises
    means for connecting a constant alternating current across opposite electrical ends of said strap.
6. The heater according to claim 1 or claim 5 wherein said means for securing comprises a latch mechanism permitting said strap to be drawn tightly about a workpiece to be heated and holding said strap in the tightened condition.
7. The heater according to claim 6 further comprising means for tightening said strap during heating to maintain tension in said strap during heating of the workpiece.
8. The heater according to claim 7 wherein said means for tightening comprises said means for applying current to said strap.
9. The heater according to claim 7 wherein said means for tightening comprises
    means for grasping one end of said strap extending outwardly from the segment of said strap disposed about a workpiece and imparting relative movement of said end of said strap relative to said segment, and
    said means for grasping having further means for applying current to said strap.
10. The heater according to claim 8 wherein one elongated flat surface of said strap has a covering to physically protect said strap from abrasion.
11. The heater according to claim 1 wherein said elongated member has a thin covering over one of its elongated, flat surfaces of a material having at least a lower resistance than said first-mentioned ferromagnetic material.
12. The heater according to claim 1 or claim 11 wherein said means for developing includes means for inductively inducing said current in said strap.
13. The heater according to claim 4 further comprising
    a layer of solder formed on a surface of said thin covering intended to contact said workpiece.
14. The heater according to claim 11 further comprising
    a layer of solder formed on a surface of said thin covering intended to contact said workpiece.
15. The combination of a heater according to claim 6 and a strap tightening mechanism for initially tightening said strap about a workpiece and permitting further tightening of said strap during heating.
16. The heater according to claim 15 wherein said strap tightening mechanism includes means for developing electric current in said strap.
17. A method of heating a workpiece comprising the steps of
    tightly encircling a workpiece with an autoregulating heater in the form of a strap,
    establishing an electric current in the strap, and
    meaintaining said strap tightly about a workpiece during heating thereof.
18. The method according to claim 17 wherein said electric current is a constant current.
19. A method of soldering a workpiece to another workpiece comprising the steps of
    overlapping the workpieces,
    strapping the workpieces together by a flexible, electric heater strap drawn tightly about the workpieces,
    applying electric current to the heater to produce heating thereof, and
    applying solder to an overlapped region of the workpieces.
20. A method of soldering according to claim 19 wherein the outer of the overlapped workpieces is compressible, the steps including
    compressing the outer workpiece against the inner workpiece.
21. The method according to claim 20 wherein the outer workpiece is porous and solder is applied to the inner surface of the strap, the method further comprising causing the solder to flow through the porous member by heating the solder by means of said strap heater.

22. The heater according to claim 1 or claim 2 wherein said elongated member has a covering over one of its elongated, flat surfaces of a material that does not adhere to solder.

23. The heater according to claim 22 wherein said covering is conductive.

24. The heater according to claim 1 further comprising:

means for maintaining said strap tightly about the workpiece during heating.

means for maintaining said strap tighly about the workpiece during heating.

25. A method of heating according to claim 17 further comprising the steps of inductively establishing an electric current in the strap.

26. A method of heating according to claim 17 or claim 25 further comprising the step of encircling the strap with a strap-like current carrying coil.

* * * * *